US012374263B1

(12) United States Patent
Maa et al.

(10) Patent No.: US 12,374,263 B1
(45) Date of Patent: Jul. 29, 2025

(54) DIGITAL DISPLAY DEVICE WITH DUAL REFRESH FREQUENCIES

(71) Applicant: Aleddra Inc., Renton, WA (US)

(72) Inventors: Chia-Yiu Maa, Bellevue, WA (US); Chun-Te Yu, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 18/791,703

(22) Filed: Aug. 1, 2024

(51) Int. Cl.
*G09G 3/20* (2006.01)

(52) U.S. Cl.
CPC ... *G09G 3/2092* (2013.01); *G09G 2340/0435* (2013.01)

(58) Field of Classification Search
None
See application file for complete search history.

(56) References Cited

U.S. PATENT DOCUMENTS 10,129,937 B1 * 11/2018 Lin ...................... H05B 45/335
2014/0058483 A1 * 2/2014 Zao .......................... A61N 5/06 607/88
2016/0282940 A1 * 9/2016 Hong ........................ G06F 3/16
2020/0164220 A1 * 5/2020 Broeng ................ A61N 5/0618
2024/0147587 A1 * 5/2024 Maa ........................ H05B 45/20
2025/0022399 A1 * 1/2025 Cheng .................. G09G 3/2092

FOREIGN PATENT DOCUMENTS

CN 115497433 A * 12/2022 ........... G09G 3/2022

OTHER PUBLICATIONS

Agger, et al., Study on the effect of 40 Hz non-invasive light therapy system, Frontiers in Aging Neuroscience, Oct. 12, 2023, pp. 1-9 (Year: 2023).*

* cited by examiner

*Primary Examiner* — Kirk W Hermann
(74) *Attorney, Agent, or Firm* — Andy M. Han; Han IP PLLC

(57) ABSTRACT

A digital display device comprises a controller and a two-dimensional digital pixel panel. The pixels of the two-dimensional digital pixel panel are divided into a first group of pixels and a second group of pixels. The controller is configured to operate the first group of pixels at a first refresh frequency (F1) and to operate the second group of pixels at a second refresh frequency (F2), different than F1. The controller may support two display channels, where the first display channel feeds a graphic content to the first group of pixels at the F1 and the second display channel feeds the graphic content to the second group of pixels at the F2. The first group of pixels and the second group of pixels interlace each other.

10 Claims, 1 Drawing Sheet

DIGITAL DISPLAY DEVICE WITH DUAL REFRESH FREQUENCIES

BACKGROUND

Technical Field

The present disclosure pertains to the field of digital display device and, more specifically, proposes digital display device with dual refresh frequencies.

Description of Related Art

Digital display is pervasive in modern consumer electronic devices with the capability of addressing and manipulating individual pixels on the display. The image of the digital display is refreshed at a fixed frequency, e.g., 60 Hz, 120 Hz, 144 Hz, etc.

Some recent research suggests that using two visible light sources each operating at a difference frequency could create an invisible flicker at a differential frequency equal to the difference of these two frequencies. By properly selecting the differential frequency, e.g., 40 Hz, such apparatus may be used for Alzheimer's disease treatment or prevention.

While a digital display is not a conventional light source with varying light output and color (temperature) fluctuations, it is still nonetheless a type of light source, especially when it is displaying a white background image or when switching to a flashlight mode (a feature supported by most smartphones). This leads to the idea of dividing the pixels of a digital display into two groups such that each group of pixels would be refreshed at a different frequency, thus creating a differential frequency between these two frequencies, mimicking the effect of using two visible light sources each operating at a different frequency. The present disclosure introduces such digital display device with dual refresh frequencies.

SUMMARY

In one aspect, the digital display device comprises a controller and a two-dimensional pixel plan. The pixels of the two-dimensional digital pixel panel are divided into a first group of pixels and a second group of pixels. The controller is configured to operate the first group of pixels at a refresh frequency F1>50 Hz. The controller is configured to operate the second group of pixels at a refresh frequency F2>50 Hz, different than F1.

The digital display device includes, but not limited to, digital computer monitor, digital television screen, laptop computer, tablet computer, smart phone, smart watch, virtual reality goggle, extended reality goggle, smart goggle, digital reading device (e.g., Amazon Kindle), etc. Each pixel may further comprise R (red), G (green), B (blue) components.

In some embodiments, the controller has two display channels: the first display channel feeds graphic content to the first group of pixels at F1 frequency, and the second display channel feeds graphic content to the second group of pixels at F2 frequency. It is to be noted that display channels refer to the logical function supported by the controller. There may or may not be two physical channels or port coming out of the controller module.

In some embodiments, the first group of pixels and the second group of pixels interlace each other pixel by pixel. Pixel-by-pixel interlacing would be ideal for the effect of the refresh frequency difference between the adjacent pixels is guaranteed to be invisible by a subject. However, pixel-by-pixel interlacing may be too expensive to manufacture. In some other embodiments, the first group of pixels and the second group of pixels interlace each other row by row. For example, all pixels on the odd rows of the two-dimensional digital pixel panel belong to the first group of pixels, and all pixels on the even rows of the two-dimensional digital pixel panel belong to the second group of pixels. Such row-by-row interlacing is easily implementable. And it can be argued that with a sufficiently high display resolution, the effect of the refresh frequency difference between the adjacent rows of pixels is still invisible to a subject.

In some embodiments, the difference between F1 frequency and F2 frequency is between 35 Hz and 45 Hz. This is the frequency proven to be most effective in treating Alzheimer's disease. There are different choices for F1 and F2 frequencies. In some embodiments, F1 frequency is 60 Hz and F2 frequency is 100 Hz. In some other embodiments, F1 frequency is 80 Hz and F2 frequency is 120 Hz.

In some embodiments, the controller is further configured to operate the first group of pixels and the second group of pixels at a same frequency (either F1 or F2 frequency) once every recalibration cycle (e.g., in minutes) for a duration called the mono operating frequency duration (e.g. in seconds). By intentionally setting both groups of pixels to the same frequency (e.g., F1 frequency), it allows the brain of a subject to phase-lock with F1 frequency during the mono operating frequency duration. After the mono operating frequency duration, the first group of pixels would be refreshed at F1 frequency, and the second group of pixels would be refreshed at F2 frequency. The brain of the subject can now sense the differential frequency between F1 and F2 frequencies. By repeating the operation of the mono operating frequency duration for every recalibration cycle, the brain of the subject would be able to detect and maintain its recognition of the differential frequency.

In some embodiments, the recalibration cycle is between 1 to 120 minutes.

In some embodiments, the mono operating frequency duration is between 5 to 20 seconds.

BRIEF DESCRIPTION OF THE DRAWINGS

The accompanying drawings are included to aid further understanding of the present disclosure and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety digital display devices having different form factors.

A digital display device comprises a controller and a two-dimensional digital pixel panel. The pixels of the two-dimensional digital pixel panel are divided into a first group of pixels and a second group of pixels. The controller is configured to operate the first group of pixels at a refresh frequency F1 and to operate the second group of pixels at a refresh frequency F2, different than F1.

Example Implementations

Figure 1:
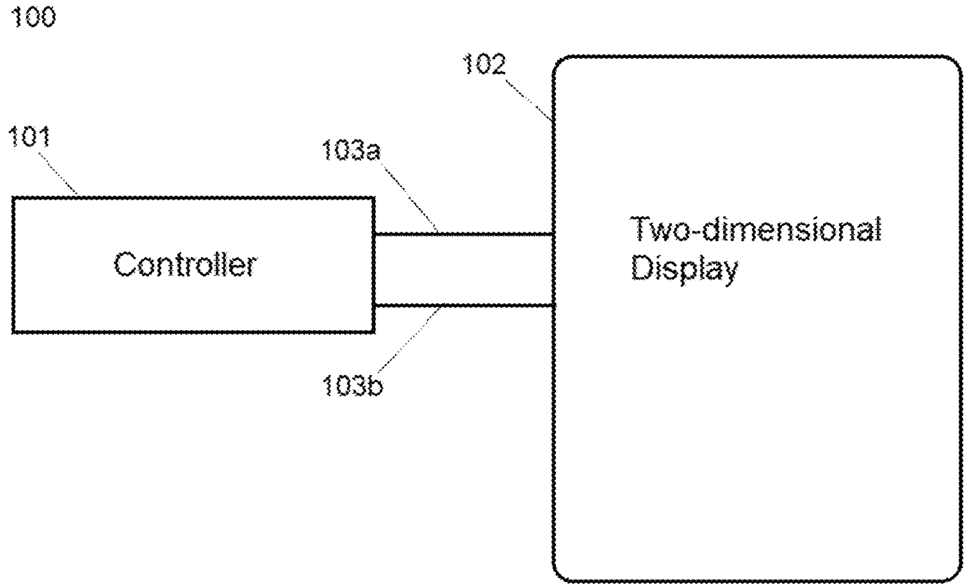
FIG. 1 schematically depicts an embodiment of the present disclosure.
Figure 2A:
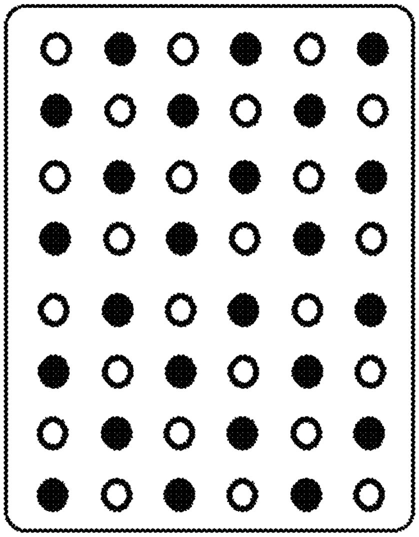
FIG. 2A schematically illustrates the pixel-by-pixel interlacing and FIG. 2B schematically illustrates the row-by-row interlacing.
Figure 2B:
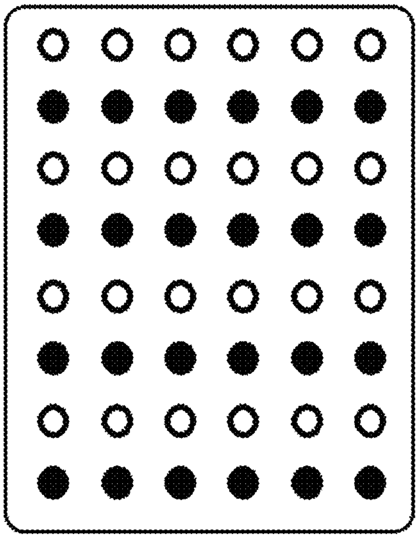

FIG. 1 shows an embodiment of the digital display device of the present disclosure 100. It comprises a controller 101 and a two-dimensional display 102. The pixels of the two-dimensional digital pixel panel 102 are divided into a first group of pixels and a second group of pixels as shown in FIGS. 2A and 2B. The white dots in FIGS. 2A and 2B denote the pixels in the first group of pixels and the black dots denote the pixels in the second group of pixels. Controller 102 has two channels 103*a*,103*b*. Controller 102 feeds graphic content through channel 103*a* to the first group of pixels at 80 Hz. Similarly, controller 101 feeds graphic content through the second display channel 103*b* to the second group of pixels at 120 Hz. The first group of pixels and the second group of pixels may interlace with each other either pixel-by-pixel (as shown in FIG. 2A) or row-by-row (as shown in FIG. 2B), depending on the implementation cost and the resolution of the two-dimensional digital pixel panel.

Moreover, controller 101 operates the first group of pixels and the second group of pixels at the same frequency 120 Hz for 10 seconds every 60 minutes. During this 10-second mono operating frequency duration, the brain of a subject would phase-lock to 120 Hz. After this mono operating frequency duration, both 80 Hz and 120 Hz refresh frequencies would be present from the two-dimensional digital pixel panel, thus inducing the brain of the subject to sense the invisible 40 Hz differential frequency.

ADDITIONAL AND ALTERNATIVE IMPLEMENTATION NOTES

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A digital display device comprising:

a controller; and a two-dimensional digital pixel panel, wherein:

a plurality of pixels of the two-dimensional digital pixel panel are divided into a first group of pixels and a second group of pixels, the controller is configured to display a graphic content via the two-dimensional digital pixel panel, the controller is configured to operate the first group of pixels at a first flicker-free refresh frequency (F1)≥60 Hz, the controller is configured to operate the second group of pixels at a second flicker-free refresh frequency (F2)≥60 Hz, different than F1, and an invisible visual simulation to a subject viewing the digital display device is induced at a frequency equal to a difference between F1 and F2.

2. The digital display device of claim 1, wherein the controller has two display channels comprising a first display channel and a second display channel, wherein the first display channel feeds a graphic content to the first group of pixels at the F1 and the second display channel feeds the graphic content to the second group of pixels at the F2.

3. The digital display device of claim 1, wherein the first group of pixels and the second group of pixels interlace each other pixel by pixel.

4. The digital display device of claim 1, wherein the first group of pixels and the second group of pixels interlace each other row by row.

5. The digital display device of claim 1, wherein a difference between the F1 and the F2 is between 35 Hz and 45 Hz.

6. The digital display device of claim 5, wherein the F1 is 60 Hz and the F2 is 100 Hz.

7. The digital display device of claim 5, wherein the F1 is 80 Hz and the F2 is 120 Hz.

8. The digital display device of claim 1, wherein the controller is further configured to operate the first group of pixels and the second group of pixels at a same frequency, either the F1 or the F2, once every recalibration cycle for a duration as a mono operating frequency duration.

9. The digital display device of claim 8, wherein the recalibration cycle is between 1 to 120 minutes.

10. The digital display device of claim 8, wherein the mono operating frequency duration is between 5 to 20 seconds.

* * * * *